Sept. 13, 1932.   E. G. SIMPSON ET AL   1,877,604
ADJUSTABLE SEAT FOR AN AUTOMOBILE
Filed Dec. 26, 1928   2 Sheets-Sheet 2
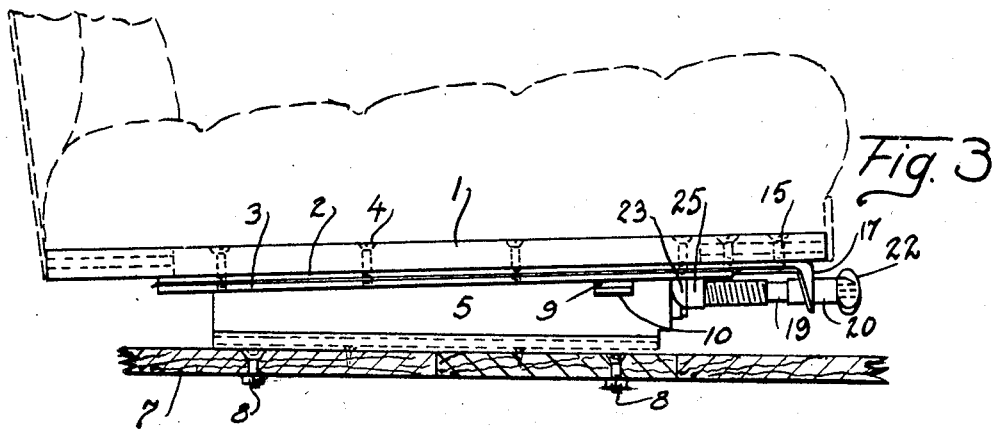
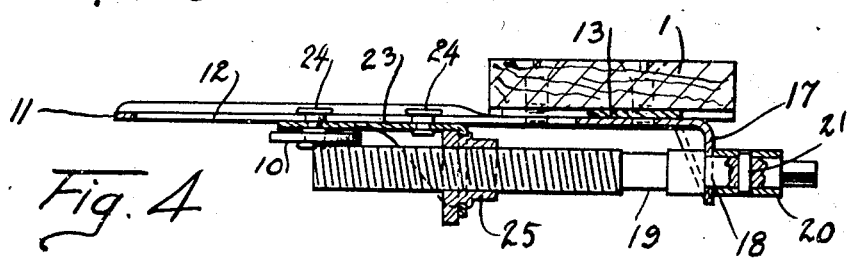
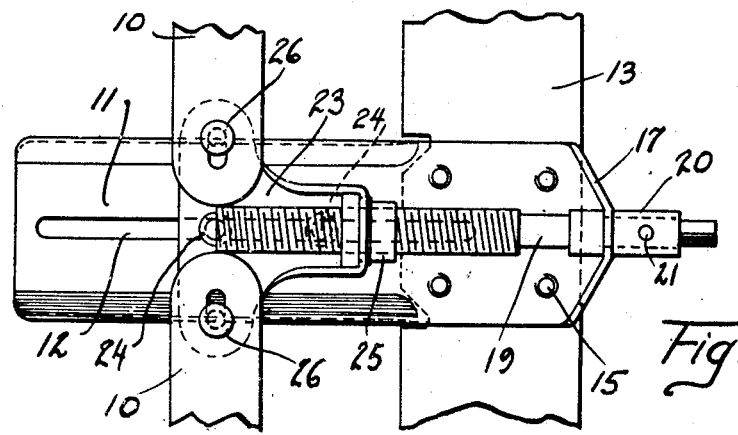
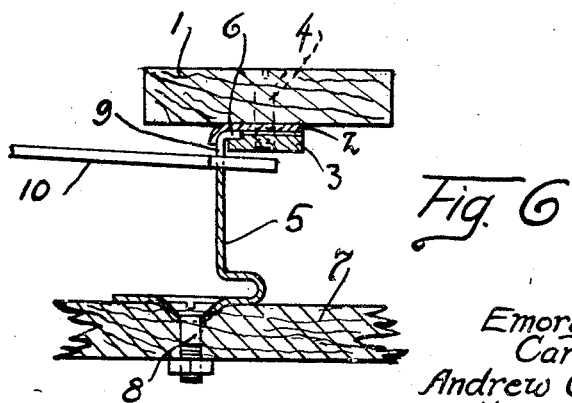
INVENTOR.
Emory Glenn Simpson,
Carl G. Cromwall,
Andrew Christian Andersen
and Herbert C. Field
BY Stuart C. Barnes ATTORNEY.

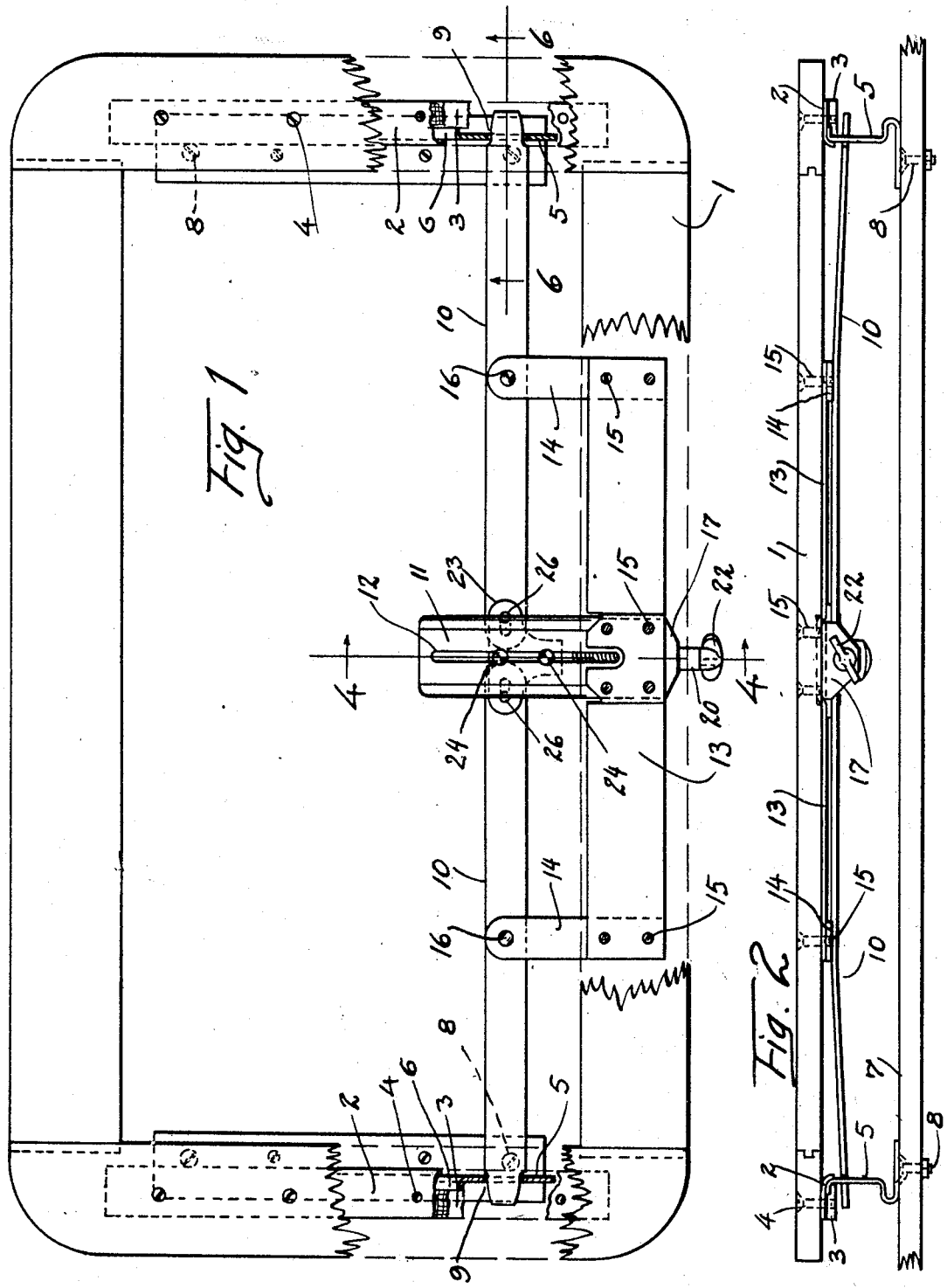

Patented Sept. 13, 1932

1,877,604

UNITED STATES PATENT OFFICE

EMORY GLENN SIMPSON, CARL G. CRONWALL, AND ANDREW CHRISTIAN ANDERSEN, OF DETROIT, MICHIGAN, AND HERBERT C. FIELD, OF WINDSOR, ONTARIO, CANADA, ASSIGNORS TO TERNSTEDT MANUFACTURING COMPANY, OF DETROIT, MICHIGAN, A CORPORATION OF MICHIGAN

ADJUSTABLE SEAT FOR AN AUTOMOBILE

Application filed December 26, 1928. Serial No. 328,416.

This invention relates to an adjustable seat for an automobile.

This invention contemplates more particularly a horizontally adjustable seat for an automobile consisting of a simple, compact, and practical assembly which will work easily, simply, and efficiently without rattling or chattering. In seats of this type, the seat often becomes cocked which creates a binding relation between the relatively movable parts, and consequently results in a hard and inefficiently working adjustable seat. In order to obviate this cocking of the seat and binding between the relatively movable seat members, we have provided an adjusting mechanism with a thrust equalizing means which causes the thrust of the adjusting mechanism to be equally distributed along the entire length of the seat, which consequently prevents any cocking of the seat and the resultant binding between the relatively movable parts.

Further, the adjusting mechanism consists of such parts which are peculiarly adapted not only to be assembled in the first instance with the automobile, but which may also be easily added to a previously assembled automobile.

In the drawings:

Fig. 1 is a top plan view of the adjustable seat with the seat frame broken away in parts in order to better disclose the adjusting mechanism.

Fig. 2 is a front elevation of the adjustable seat.

Fig. 3 is a side elevation of the seat.

Fig. 4 is a section along the line 4—4 of Fig. 1.

Fig. 5 is a detailed top plan view showing the assembly of the threaded block, center plate, bracket, the threaded bolt, and the thrust equalizing levers.

Fig. 6 is a section along the line 6—6 of Fig. 1.

Referring more particularly to the drawings, it will be seen that the adjustable seat consists of a seat frame which is designated by the numeral 1. The seat is supported by the seat supports which consist more specifically of the flanged upper slide member 2 and the lower slide member 3. These slide members are attached to the seat frame and to each other by means of the bolts referenced 4. The seat supports also consist of track members designated by the numeral 5. The track member 5 has a flange 6 which slidably engages the slide members 2 and 3. The track is attached to the floor 7 by any suitable means such as the bolts 8. Each track member has a slot 9 for operative engagement with the thrust equalizing lever arms 10.

The adjusting mechanism consists of a cross plate 13, end plates 14, and a center plate 11 which has a longitudinal slot 12, and of the thrust equalizing arms 10 which have a downward bow to force them against the bottom of slots 9 to eliminate rattle. The center plate has a flange 17 in which is the opening 18. A threaded adjusting screw 19 rotatively engages the flange 17 in the opening 18 and is prevented from longitudinal movement by the collar 20 which fits over, and is positively engaged to, the threaded adjusting screw 19 by means of the rivet 21. The threaded adjusting screw may be turned by any suitable crank as at 22.

A slide member 23 is slidably attached to the center plate by means of the headed rivets 24 which are adapted for longitudinally sliding engagement with the slot 12 in the center plate 11. The threaded block 25 is attached in fixed relation to the slide 23 and this block member engages the threaded portion of the threaded adjusting screw 19. The thrust equalizing levers are pivotally connected to the slide by means of the headed studs 26 and are pivotally connected to the end plates by the pins 16. The center plate 11 is attached in fixed relation to the cross plate 13 by any suitable means so that the longitudinal slot 12 is equidistant from the pins 16 by means of which the lever arms 10 are pivotally supported by the end plates 14. The thrust equalizing lever arms also extend through the slots 9 in the track members 5.

The cross plate, center plate, and end plates are attached in fixed relation to the seat frame 1 by any suitable means such as the screws 15.

It will be readily seen that the seat may be moved either backward or forward as desired by turning the crank member 22 which causes the block 25 and slide 23 to move longitudinally on the threaded adjusting screw 19. This movement of the bracket 23 causes the thrust equalizing arms 10 to pivot about the pins 16. Since the end plates, the center plate, and the cross plate, and the guide members 2 and 3 are positively fixed to the seat frame and since the track member 5 is positively fixed to the floor 7, relative movement will be effected between the track 5 and the seat frame 1. Since the thrust equalizing lever arms pivotally engage the end plates 14 at the pins 16 which are equidistant from the longitudinal slot 12 in the plate 11, it is obvious that the thrust effected by a turning of the crank member 22 will be equally exerted against the points of contact between the thrust equalizing levers 10 and the track members 5, hence, there will be no cocking of the seat with a consequent binding between the slide members 2 and 3 and the track members 5.

What we claim is:

1. An horizontally adjustable vehicle seat comprising in combination a seat support, a seat slidably and solely carried by this support and an adjusting mechanism exclusively for adjusting said seat including a member consisting of a center plate, a cross plate, and end plates, said member fixed to said seat, thrust equalizing lever arms pivotally connected to said end plates and operatively connected to said seat support, and adjusting means for effecting relative movement between said member and said thrust equalizing lever arm to slidably and horizontally adjust the seat.

2. An adjustable vehicle seat comprising in combination a seat support, a seat slidably carried by this support, and an adjusting mechanism including thrust equalizing lever arms operatively connected with said seat support, a member fixed to said seat and consisting of a cross plate, end plates, and a center plate with a longitudinal slot equidistant from the end plates, a slide adapted to slidably engage said center plate, said thrust equalizing lever arms adapted to be operatively connected at one end to said slide and at the other end to said seat support and adapted to pivotally engage the end plates at points equidistant from the longitudinal slot in the center plate, and means for effecting relative movement between said slide and said center plate.

3. An adjustable seat mechanism for attachment to the bottom of a vehicle seat comprising a frame including guide means arranged to be removably secured to the bottom of the seat, a center slide member for said guide means that can be caused to move forwardly and backwardly, swing thrust levers pivoted to the frame and connected to the slide, and an arranged fulcrum at the ends of the swing thrust levers on a stationary part of the vehicle body to cause the seat to move backwardly and forwardly.

4. A vehicle seat adjusting mechanism comprising a frame including guide means, a pair of levers each pivoted intermediate its length to said frame, a center slide for said guide means connected to the inner ends of the levers and arranged to move back and forth, a screw journaled in the frame for moving the slide backward and forward, the ends of the levers arranged to fulcrum on a stationary part of the vehicle body to force the seat backwardly and forwardly.

5. A vehicle seat adjusting mechanism comprising a frame, a pair of flexible levers each pivoted intermediate its length to said frame, a center slide connected to the inner ends of the levers and arranged to move back and forth, a screw journaled in the frame for moving the slide backward and forward, the ends of the levers arranged to fulcrum on a stationary part of the vehicle body to force the seat backwardly and forwardly.

6. An adjustable vehicle seat comprising in combination a seat support, a seat slidably carried by this support, and an adjusting mechanism for adjusting said seat along said support including bowed thrust equalizing levers adapted to resiliently engage said seat support.

In testimony whereof we have affixed our signatures.

EMORY GLENN SIMPSON.
CARL G. CRONWALL.
ANDREW CHRISTIAN ANDERSEN.
HERBERT C. FIELD.